United States Patent
Xie et al.

(10) Patent No.: US 10,982,014 B2
(45) Date of Patent: Apr. 20, 2021

(54) CYCLODEXTRIN POLYMER WITH ULTRA-FAST ADSORPTION PERFORMANCE

(71) Applicant: NANJING UNIVERSITY, JingSu (CN)

(72) Inventors: Xianchuan Xie, JingSu (CN); Guizhou Xu, JingSu (CN); Long Qin, JingSu (CN)

(73) Assignee: NANJING UNIVERSITY, JiangSu (CN)

( * ) Notice: Subject to any disclaimer, the term of this patent is extended or adjusted under 35 U.S.C. 154(b) by 0 days.

(21) Appl. No.: 16/434,905

(22) Filed: Jun. 7, 2019

(65) Prior Publication Data
US 2019/0375858 A1 Dec. 12, 2019

(30) Foreign Application Priority Data

Jun. 8, 2018 (CN) .......................... 201810589683.7

(51) Int. Cl.
*C08B 37/16* (2006.01)
*C08J 3/24* (2006.01)

(52) U.S. Cl.
CPC ............. *C08B 37/0012* (2013.01); *C08J 3/24* (2013.01)

(58) Field of Classification Search
CPC .. C08B 37/0012; C08B 37/00; C08B 37/0015
See application file for complete search history.

(56) References Cited

U.S. PATENT DOCUMENTS 5,360,899 A * 11/1994 Nussstein ................ B01J 20/26
536/103
2016/0304630 A1* 10/2016 Dichtel .............. G01N 30/7233

OTHER PUBLICATIONS

Heidel ; Journal of Drug Delivery; 2012; Article ID 262731; pp. 1-17.*
Dorwald F. A. Side Reactions in Organic Synthesis, 2005, Wiley: VCH, Weinheim p. IX of Preface.*

* cited by examiner

*Primary Examiner* — Pancham Bakshi
(74) *Attorney, Agent, or Firm* — Juan Carlos A. Marquez; Marquez IP Law Office, PLLC

(57) ABSTRACT

A novel cyclodextrin polymer with ultra-fast adsorption performance is provided. A cyclodextrin polymer having a three-dimensional network structure is obtained by mixing and crosslinking a cyclodextrin with a rigid crosslinking agent and a non-rigid crosslinking agent at a certain temperature. The polymer is capable of adsorbing a plurality of organic pollutants in water at an ultra-fast rate, and the polymer after adsorption is easily regenerated by simple washing at a normal temperature, and is repeatedly used without causing a decrease in adsorption performance.

3 Claims, 8 Drawing Sheets

| sample | C (wt%) | H (wt%) | N (wt%) | F (wt%) | TFTPN content (wt%) | Substitutio n of F | H₂O regain (wt%) | Volumetric H₂O regain (cm³ g⁻¹) | Dry pore volume[a] (cm³ g⁻¹) | $S_L$[b] (m² g⁻¹) | $S_{BET}$[c] (m² g⁻¹) |
|---|---|---|---|---|---|---|---|---|---|---|---|
| EPI-CDP | 46.71 | 7.23 | -- | -- | -- | -- | 346 | 3.46 | 0.0018 | 1.2 | 0.005 |
| CDP-2 | 43.27 | 5.87 | 1.72 | 0.79 | 8.41 | 3.32 | 263 | 2.63 | 0.0339 | 103 | 0.311 |
| P-CDP | 45.58 | 4.19 | 6.09 | 6.39 | 33.36 | 2.45 | 372 | 3.72 | 0.0646 | 193 | 169 |

[a] Pore volume measured by CO₂ adsorption isotherm

[b] Langmuir specific surface area measured by CO₂ adsorption isotherm

[c] BET specific surface area measured by N₂ adsorption isotherm

|  | Pseudo-second order | | | Elovich | | |
| --- | --- | --- | --- | --- | --- | --- |
|  | $k_2$ (g mmol$^{-1}$ s$^{-1}$) | $q_e$ (mmol g$^{-1}$) | $R^2$ | $\alpha$ (mmol g$^{-1}$ s$^{-1}$) | $\beta$ (g mmol$^{-1}$) | $R^2$ |
| EPI-CDP | 0.0445 | 0.0940 | 0.978 | 7.14 E$^{-4}$ | 48 | 0.991 |
| CDP-2 | 7.61 | 0.0961 | 0.999 | 1.10 E$^{14}$ | 466 | 0.999 |
| P-CDP | 7.45 | 0.0934 | 0.998 | 2.57 E$^{12}$ | 438 | 0.999 |
Fig.10
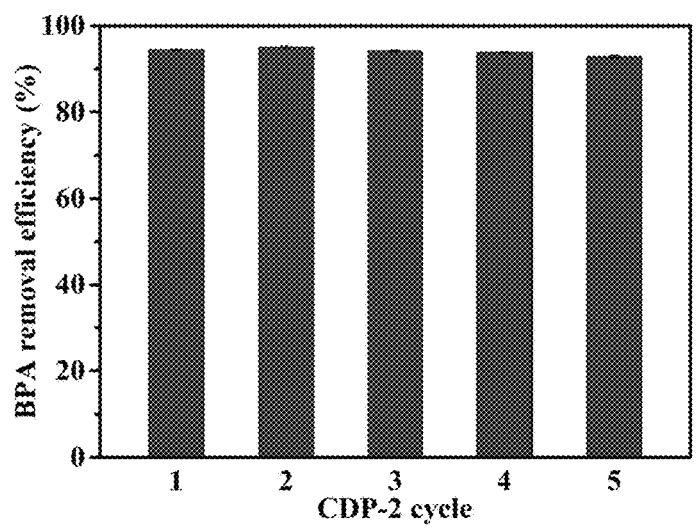
Fig.11
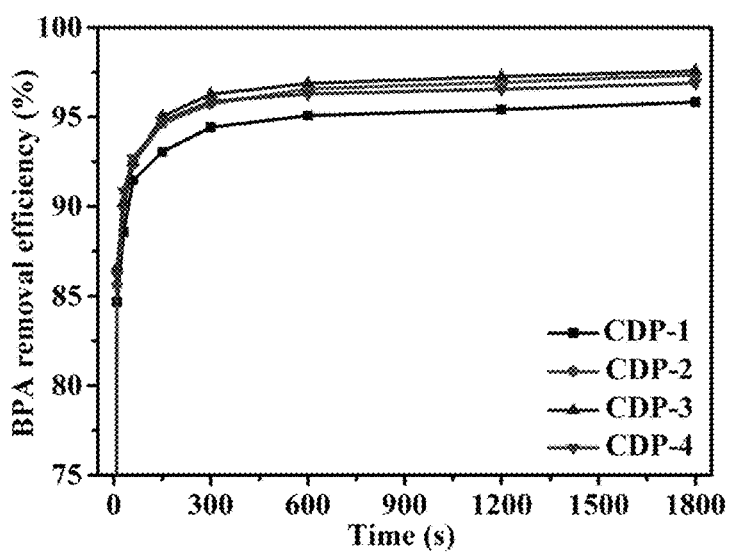
Fig.12

_US 10,982,014 B2_

CYCLODEXTRIN POLYMER WITH ULTRA-FAST ADSORPTION PERFORMANCE

TECHNICAL FIELD

The present disclosure relates to a novel cyclodextrin polymer with ultra-fast adsorption performance.

BACKGROUND

Cyclodextrin is a general term for a class of cyclic oligosaccharides obtained by hydrolysis of starch, usually containing 6 to 12 glucose units. Those that have been studied more and have practical significance are molecules containing 6, 7, and 8 glucose units, called α, β, and γ-cyclodextrin respectively. Cyclodextrin has a circular hollow structure, which is hydrophilic outside and hydrophobic inside, and thus can form a host-guest inclusion compound with various target molecules.

Since cyclodextrin has certain water solubility, it is usually prepared into various cyclodextrin polymers as needed. To date, most of the cyclodextrin polymers are obtained by crosslinking reaction of a cyclodextrin with a flexible crosslinking agent such as citric acid or epichlorohydrin. This type of reaction is easily carried out in aqueous phase, and the obtained cyclodextrin polymer has a certain swelling property. But, since all the crosslinking agents used are non-rigid, the molecular segments of the generated cyclodextrin polymer are interwound, resulting in such cyclodextrin polymers being non-porous and having a low specific surface area (<10 $m^2/g$), which limits the application thereof. In particular, as adsorbents, their adsorption rate is relatively slow, and it usually takes several hours or more to reach adsorption equilibrium.

Recently, in order to solve such problems, Alsbaiee et al. prepared a porous cyclodextrin polymer (P-CDP) with a high specific surface area by making a crosslinking agent that has a rigid structure react with a cyclodextrin. Due to the introduction of the rigid structure, the molecular chains of the resulting polymer are difficult to bend freely, and the intermolecular packing is not tight, forming a microporous structure. This cyclodextrin polymer exhibits a very fast adsorption effect on various organic pollutants in water, and the adsorption rate can reach 15 to 200 times that of activated carbon and ordinary non-porous cyclodextrin polymer.

However, in the prior art, the synthesis of the above-mentioned porous cyclodextrin polymer P-CDP requires a reaction in an organic phase for a relatively long time (48 h), which limits the industrial production thereof. Although Alsbaiee et al. also prepared a cyclodextrin polymer (NP-CDP) using a cyclodextrin and a rigid crosslinking agent in the aqueous phase, the resulting polymer was non-porous and the adsorption rate to organic pollutants was very slow. Therefore, how to prepare a cyclodextrin polymer material in a simple manner in the aqueous phase while maintaining its fast adsorption performance has become a new subject.

PRIOR ART DOCUMENT

Non-Patent Document 1

AAlsbaiee, B J Smith, L Xiao, Y Ling, D E Helbling, W R Dichtel, Rapid removal of organic micropollutants from water by a porous β-cyclodextrin polymer, _Nature_ 529 (7585), 190

SUMMARY

The Technical Problem to be Solved

The present disclosure proposes to use a non-rigid crosslinking agent and a rigid crosslinking agent simultaneously in the preparation of a cyclodextrin polymer based on previous studies. The introduction of the non-rigid crosslinking agent can crosslink the cyclodextrin monomer and impart a certain swelling property to the polymer material. The rigid crosslinking agent can be used as a structure regulation agent to make the polymer material have certain microporosity and be capable of maintaining the stability of the polymer pores after swelling as a skeleton. The cyclodextrin polymer material thus prepared exhibits very fast adsorption performance to organic pollutants in the water. The preparation of the polymer only needs to be carried out in aqueous phase, and the synthesis process is very simple and easy for industrial production.

The technical solution of the present disclosure is as follows:

Provided is a novel cyclodextrin polymer with ultra-fast adsorption performance, which is obtained through the following process. A cyclodextrin is cross-linked with a non-rigid crosslinking agent and a rigid crosslinking agent in an alkaline aqueous solution at a certain temperature, filtered after completion of the reaction, washed several times with water and tetrahydrofuran successively, and dried.

Therefore, the present disclosure provides:

1. A method for preparing a cyclodextrin polymer, wherein the cyclodextrin polymer is obtained by mixing a cyclodextrin with a rigid crosslinking agent and a non-rigid crosslinking agent to carry out a crosslinking reaction
2. Preferably, the cyclodextrin is α-cyclodextrin, β-cyclodextrin, or γ-cyclodextrin, and a combination thereof.
3. Preferably, the rigid crosslinking agent is a crosslinking agent having a benzene ring structure.
4. Preferably, the crosslinking agent having a benzene ring structure is selected from a group consisting of tetrafluoroterephthalonitrile, decafluorobiphenyl, decafluorobenzophenone, octafluoronaphthalene, or a combination thereof.
5. Preferably, the molar ratio of the rigid crosslinking agent to the cyclodextrin is 0.375 to 1.5.
6. Preferably, the non-rigid crosslinking agent is epichlorohydrin.
7. Preferably, the molar ratio of the non-rigid crosslinking agent to the cyclodextrin is 20 to 50.
8. Preferably, the crosslinking reaction is carried out in an alkaline aqueous solution. The alkaline aqueous solution is an aqueous solution of sodium hydroxide or potassium hydroxide.
9. Preferably, the concentration of the alkaline aqueous solution is 2 to 8 mol $L^{-1}$.
10. A cyclodextrin polymer obtained by mixing a cyclodextrin with a rigid crosslinking agent and a non-rigid crosslinking agent to carry out a crosslinking reaction, wherein the cyclodextrin polymer has a three-dimensional network structure.
11. Use of the cyclodextrin polymer of (10) for removing organic matter from water.

In the present disclosure, the cyclodextrin is mixed and crosslinked with the non-rigid crosslinking agent and the rigid crosslinking agent, so that the prepared cyclodextrin polymer may have certain swellability, porosity and rigidity at the same time. This novel cyclodextrin polymer can remove organic matter from water very quickly.

BRIEF DESCRIPTION OF THE DRAWINGS

FIG. 10 is a table showing the fitting parameters of the pseudo-second order kinetics equation and the Elovich equation for the adsorption kinetics of BPA in Example 2 and Comparative Example 1 and Comparative Example 2.

FIG. 11 is a graph showing the effect of the number of times of repeated use of the cyclodextrin polymer CDP-2 prepared in Example 2 on the BPA adsorption performance of the material.

FIG. 12 is a graph showing the change in BPA removal efficiency over time for polymers prepared with different types of cyclodextrin.

EMBODIMENTS

Synthesis of Cyclodextrin Polymer

A certain amount of cyclodextrin is weighed into a round bottom flask and dissolved completely by adding an alkaline aqueous solution, and then appropriate amounts of rigid crosslinking agent and flexible crosslinking agent are added. The round bottom flask is placed in an oil bath equipped with a magnetic stirring device, and a magnetic stirrer is put in. The oil bath temperature and the rotating speed are adjusted, and the reaction is allowed to continue for 3 hours after reaching the set temperature. After the reaction is completed, the mixture is filtered, and the precipitate is washed successively with distilled water, an organic washing solvent (such as tetrahydrofuran, ethanol, etc., which can dissolve the unreacted crosslinking agent) for several time. The obtained solid is further dried under vacuum for 12 h and a novel cyclodextrin polymer is obtained.

Figures 1, 2:
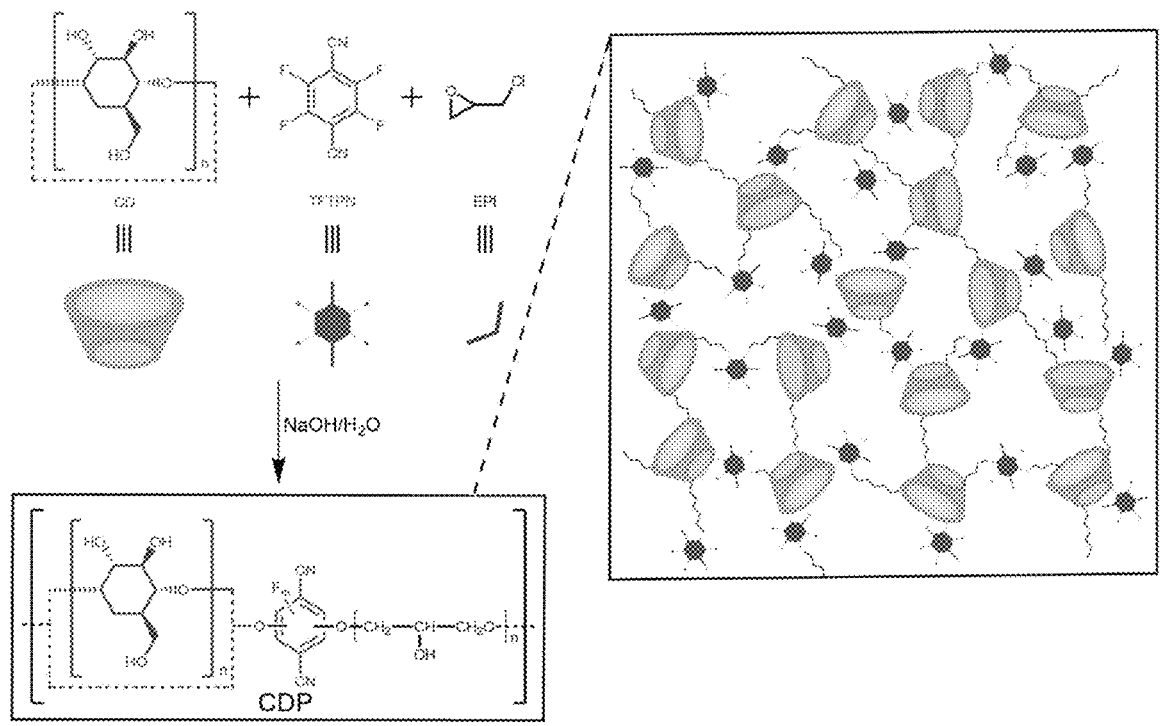
FIG. 1 is a synthetic scheme for preparing a novel cyclodextrin polymer by mixing and crosslinking epichlorohydrin and tetrafluoroterephthalonitrile with cyclodextrin and a schematic diagram of structure of the obtained polymer.
FIG. 2 is a chart of elemental analysis, water absorption analysis, and specific surface area analysis of Example 2 and Comparative Example 1 and Comparative Example 2.

FIG. 1 is a schematic view showing the synthesis route of a novel cyclodextrin polymer. It can be seen that the preparation process of the polymer is very simple, the raw materials used are easily obtained, and the obtained polymer has a three-dimensional network structure.

The cyclodextrin to be used is a cyclodextrin of a cyclic oligosaccharide having 6 to 8 glucose units, that is, a α cyclodextrin, a β cyclodextrin and a γ cyclodextrin.

The cyclodextrin to be used can be commercial products purchased from various companies, for example, from Aladdin, Sigma-Aldrich.

The cyclodextrin to be used may also be a polymer such as a dimer or a trimer of each of the above cyclodextrin.

A crosslinking agent having a structure such as a benzene ring, a naphthalene ring or another rigid cyclic structure may be selected as the rigid crosslinking agent. Moreover, the crosslinking agent to be used needs to have at least two groups capable of reacting with a hydroxyl group on the cyclodextrin. These rigid crosslinking agent may be selected from tetrafluoroterephthalonitrile, tetrachloroterephthalonitrile, decafluorobiphenyl, octafluoronaphthalene, etc., or a mixture thereof. As a preferable rigid crosslinking agent, the most preferable rigid crosslinking agent is tetrafluoroterephthalonitrile from the viewpoint of cost and reactivity.

Epichlorohydrin may be selected as the flexible crosslinking agent from the viewpoint of reactivity and economy. However, those skilled in the art will recognize that any chain crosslinking agent capable of reacting with a hydroxyl group on the cyclodextrin or a group on the rigid crosslinking agent may be selected theoretically. There are no specific requirements for the length of the chain and the length of the chain depends on the actual needs, but it is preferably a substance capable of dissolving the rigid crosslinking agent.

The cyclodextrin polymer of the present disclosure combines the advantages of the rigid material and the flexible material and has a certain porosity and swellability. The material can maintain a certain pore structure after swelling. Therefore, the polymer exhibits an ultra-fast adsorption performance for a variety of organic micro-pollutants.

The organic micro-pollutants to be adsorbed are some organic pollutants that are harmful to the environment and are widely concerned. There are mainly endocrine disruptors, plastic components, organic phenolic substances, etc. For example, the endocrine disruptors include, but are not limited to, ethinyl estradiol, estriol, and estradiol. For example, the plastic components include, but are not limited to, bisphenol A and bisphenol S. For example, the organic phenolic substances include, but are not limited to, 2-naphthol, 3-phenylphenol, and 2, 4, 6-trichlorophenol.

The concentration of organic micro-pollutants is not specifically defined as long as it can be dissolved. The addition amount of cyclodextrin polymer depends on actual needs. In the Examples, the concentration of the organic micro-pollutants is 0.1 mmol/L, but the concentration of ethinyl estradiol and estradiol is 0.05 mmol/L because their solubility in water is too low, and the amount of the cyclodextrin polymer added is 1 mg/ml.

After the cyclodextrin polymer and the aqueous solution of the organic micro-pollutants are contacted for a certain period, the cyclodextrin polymer is separated by filtration. The content of the organic micro-pollutants in the filtrate is analyzed by high performance liquid chromatography to determine the removal efficiency of the organic micro-pollutants.

The cyclodextrin polymer after filtration separation is washed with methanol, whereby the cyclodextrin polymer is regenerated. The regenerated cyclodextrin polymer can be reused in the method of the present disclosure.

EXAMPLES

In order to better understand the present disclosure, various cyclodextrin polymers were prepared under different conditions (such as cyclodextrin type, rigid crosslinking agent and flexible crosslinking agent type and addition amount, alkali solution type and concentration, etc.), and their adsorption effects on various organic micro-pollutants in aqueous solution were characterized. The specific conditions of each Example are shown in Table 1. In order to illustrate the adsorption effect of the cyclodextrin polymer prepared in the present disclosure, two different cyclodextrin polymers were also prepared as Comparative Examples by reference to the literatures. In Comparative Example 1, a cyclodextrin polymer (EPI-CDP) that is the most studied and the best developed and commercialized in the field of adsorption was prepared. This polymer has a non-porous structure and a low specific surface area. In Comparative Example 2, a recently reported porous cyclodextrin material (P-CDP) with a high surface area was prepared. According to the reports, this polymer has many mesopores, and the pore size thereof is mainly distributed between 1.8 nm to 3.5 nm.

TABLE 1

Summary table of Examples

| Example | Name | cyclodextrin | rigid crosslinking agent | rigid crosslinking agent/cyclodextrin (mol/mol) | flexible crosslinking agent | flexible crosslinking agent/cyclodextrin (mol/mol) | alkali | alkali concentration (mol/L) | adsorption rate |
|---|---|---|---|---|---|---|---|---|---|
| 1 | CDP-1 | A | TFTPN | 0.75 | EPI | 35 | NaOH | 4 | very fast |
| 2 | CDP-2 | B | TFTPN | 0.75 | EPI | 35 | NaOH | 4 | very fast |
| 3 | CDP-3 | Γ | TFTPN | 0.75 | EPI | 35 | NaOH | 4 | very fast |
| 4 | CDP-4 | β + γ (1 + 1) | TFTPN | 0.75 | EPI | 35 | NaOH | 4 | very fast |
| 5 | CDP-5 | B | DFBP | 0.75 | EPI | 35 | NaOH | 4 | relatively fast |
| 6 | CDP-6 | B | DFBPN | 0.75 | EPI | 35 | NaOH | 4 | very fast |
| 7 | CDP-7 | B | OFN | 0.75 | EPI | 35 | NaOH | 4 | relatively fast |
| 8 | CDP-8 | B | TFTPN + DFBPN (1 + 1) | 0.75 | EPI | 35 | NaOH | 4 | very fast |
| 9 | CDP-9 | B | TFTPN | 0.1875 | EPI | 35 | NaOH | 4 | very slow |
| 10 | CDP-10 | B | TFTPN | 0.375 | EPI | 35 | NaOH | 4 | very fast |
| 11 | CDP-11 | B | TFTPN | 1.5 | EPI | 35 | NaOH | 4 | very fast |
| 12 | CDP-12 | B | TFTPN | 3 | EPI | 35 | NaOH | 4 | relatively slow |
| 13 | CDP-13 | B | TFTPN | 0.75 | EPI | 5 | NaOH | 4 | very slow |
| 14 | CDP-14 | B | TFTPN | 0.75 | EPI | 20 | NaOH | 4 | very fast |
| 15 | CDP-15 | B | TFTPN | 0.75 | EPI | 50 | NaOH | 4 | very fast |
| 16 | CDP-16 | B | TFTPN | 0.75 | EPI | 65 | NaOH | 4 | relatively slow |
| 17 | CDP-17 | B | TFTPN | 0.75 | EPI | 35 | KOH | 4 | very fast |
| 18 | CDP-18 | B | TFTPN | 0.75 | EPI | 35 | NaOH | 2 | very fast |
| 19 | CDP-19 | B | TFTPN | 0.75 | EPI | 35 | NaOH | 6 | very fast |
| 20 | CDP-20 | B | TFTPN | 0.75 | EPI | 35 | NaOH | 8 | very fast |

*Note:
TFTPN: tetrafluoroterephthalonitrile;
DFBP: decafluorobiphenyl;
DFBPN: decafluorobenzophenone;
OFN: octafluoronaphthalene;
EPI: epichlorohydrin;
β + γ (1 + 1): the ratio of the amount of β cyclodextrin and γ cyclodextrin substances is 1:1;
TFTPN + DFBPN (1 + 1): the ratio of the amount of TFTPN and DFBPN substances is 1:1;
very fast: the adsorption equilibrium is reached in 10 min;
relatively fast: the adsorption equilibrium is reached in 20 min;
relatively slow: the adsorption equilibrium is reached in 30 min;
very slow: no adsorption equilibrium is reached in 30 min.

Comparative Example 1: Preparation of Non-Porous β-Cyclodextrin Polymer EPI-CDP The preparation of EPI-CDP was according to the method described in Non-Patent Document 1.

(1) 3 g of β-cyclodextrin was weighed into a round bottom flask and 5 ml of 6.25 mol $L^{-1}$ NaOH solution was added. The mixture was stirred on a magnetic stirrer until the β-cyclodextrin was completely dissolved. (2) The flask was placed into an oil bath, the temperature was adjusted to 60° C., and the rotation speed was set to 120 rpm. 2.5 ml of epichlorohydrin solution was added dropwise, and the reaction was continued for 1 h after the addition was completed. (3) After completion of the reaction, a white gel appeared. The gel was filtered into a beaker and successively washed and purified with distilled water, tetrahydrofuran and dichloromethane for 3 to 4 times. (4) The purified product was vacuum-lyophilized for 12 to 24 h to obtain a non-porous β-cyclodextrin polymer EPI-CDP.

Comparative Example 2: Preparation of Porous β-Cyclodextrin Polymer P-CDP

The preparation of P-CDP was according to the method described in Non-Patent Document 1.
(1) First, 3.08 g of β-cyclodextrin and 1.62 g of tetrafluoroterephthalonitrile were weighed into a thick-walled pressure bottle, and 54 ml of tetrahydrofuran and 6 ml of dimethylformamide were added. Then, nitrogen replacement was carried out under magnetic stirring for several times until the thick-walled pressure bottle was filled with nitrogen. (2) The thick-walled pressure bottle was placed in an oil bath, the temperature was adjusted to 85° C., and the rotation speed was set to 120 rpm. The reaction was terminated after 48 h. (3) The yellow precipitate was filtered into a beaker after the reaction is completed. The product was first washed with dilute hydrochloric acid to neutrality, and then washed and purified successively with distilled water and tetrahydrofuran for 15 min each time for several times until the eluent became colorless, and finally washed with dichloromethane for one time. (4) The purified product was lyophilized for 12 to 24 h to obtain a porous β-cyclodextrin polymer P-CDP.

Characterization of Cyclodextrin Polymer

The prepared cyclodextrin polymer was first characterized by structure, morphology, composition and specific surface area. The specific characterization and characterization instruments and conditions are as follows:

Elemental analysis: C, H, and N elements were measured using a CHN—O-Rapid elemental analyzer (Heraeus, Germany). The F element analysis was carried out using an F-ion selective electrode, and the sample was first burned by an oxygen flask combustion method and then measured after being absorbed by an alkali.

Infrared measurement: a Bruker Tensor 27 Fourier infrared spectrometer was used, the material and KBr were mixed and ground and measured after tableting.

XRD measurement: a Bruker D8—Advance X-ray powder Diffractometer with a scanning speed of 8°/min, a scanning range of 5 to 70°, a scan mode of theta/2 theta, a scan method of continue, a tube voltage of 40 kV, a tube current of 40 mA, and a Cu target ($\lambda$=1.54178 Å) was used.

Solid-State Nuclear Magnetic Resonance measurement: a Varian INOVA-600 Solid-state nuclear magnetic resonance spectrometer was used. The sample was placed in a silicon nitride rotor with a 7 mm outer diameter and then placed in a magic angle detector for measurement.

Specific surface area analysis: a Micromeritics ASAP 2020-M+C specific surface analyzer was used, 50 to 100 mg of sample was first activated at 90° C. for 24 h and then backfilled with N2. The $N_2$ adsorption-desorption isotherm was then determined under liquid nitrogen (77 K) condition. The specific surface area of the material was calculated using the BET method carried by the instrument. The $CO_2$ adsorption-desorption isotherm was measured at 273 K, and the specific surface area of the material was calculated using the Langmuir method.

Thermogravimetric analysis: a Mettler-Toledo (TGA/DSC) thermal analyzer was used and the thermogravimetric curve was measured under a $N_2$ atmosphere at a temperature range of 30 to 600° C. and a heating rate of 10° C./min.

Scanning electron microscopy analysis: an S-4800 scanning electron microscope was used and the scanning voltage was 10 kV. Before the sample was measured the surface thereof was treated by spraying gold to increase the conductivity.

The cyclodextrin polymer characterization results are illustrated by the cyclodextrin polymers prepared in Example 2, Comparative Example 1, and Comparative Example 2.

FIG. 2 shows the elemental analysis, water absorption analysis and specific surface area analysis results of the polymer. It can be seen that the molar ratios of F to N in the polymer P-CDP of Comparative Example 2 and the cyclodextrin polymer CDP-2 of Example 2 were lower than that of the tetrafluoroterephthalonitrile monomer, indicating a partial substitution of F, and indicating that tetrafluoroterephthalonitrile has reacted. In addition, CDP-2 has a water absorption ratio of 263% of its own weight, but is lower than the water absorption ratio of 346% of the non-porous polymer EPI-CDP prepared by crosslinking only epichlorohydrin with β-cyclodextrin in Comparative Example 1. It indicates that the introduction of the epichlorohydrin segment retains a certain swelling property of the material, so that it has a certain water absorption capacity, and that the introduction of the tetrafluoroterephthalonitrile segment increases the rigidity of the material, resulting in a decrease in the swellability and water absorption. The polymer P-CDP in Comparative Example 2 had a very high water absorption ratio (372%) because it itself had a large specific surface area.

Figure 3:
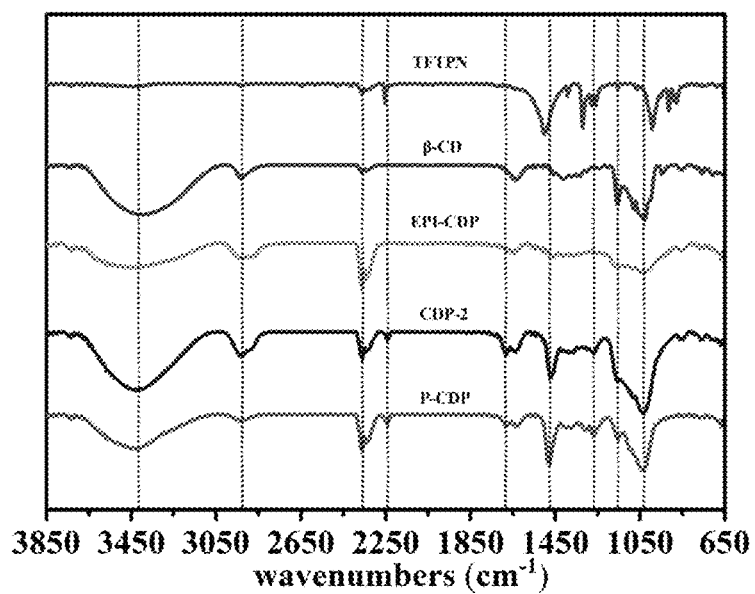
FIG. 3 is an infrared spectrum diagram of Example 2 and Comparative Example 1 and Comparative Example 2.

The infrared spectrum of the polymer is shown in FIG. 3. Compared with cyclodextrin monomer, the C—H asymmetric stretching vibration at 2930 $cm^{-1}$ of the polymers EPI-CDP and CDP-2 became wider, and the C—OH stretching vibration at 1035 $cm^{-1}$ overlapped with the C—O—C stretching vibration at 1160 $cm^{-1}$, indicating that epichlorohydrin and cyclodextrin have reacted. Compared with tetrafluoroterephthalonitrile monomer, the absorption of the polymers P-CDP and CDP-2 at 2240 $cm^{-1}$ corresponds to the stretching vibration of the cyano group; the absorption at 1035 $cm^{-1}$ and 1473 $cm^{-1}$ corresponds to the stretching vibration of aromatic carbon; and the absorption at 1267 $cm^{-1}$ corresponds to the C—F stretching vibration and the absorption there becomes weak, indicating a partial substitution of F. This indicates that tetrafluoroterephthalonitrile and cyclodextrin have reacted.

Therefore, it can be known that the novel cyclodextrin polymer CDP-2 prepared in the Example is obtained by mixing and crosslinking epichlorohydrin and tetrafluoroterephthalonitrile with β-cyclodextrin.

Figure 4:
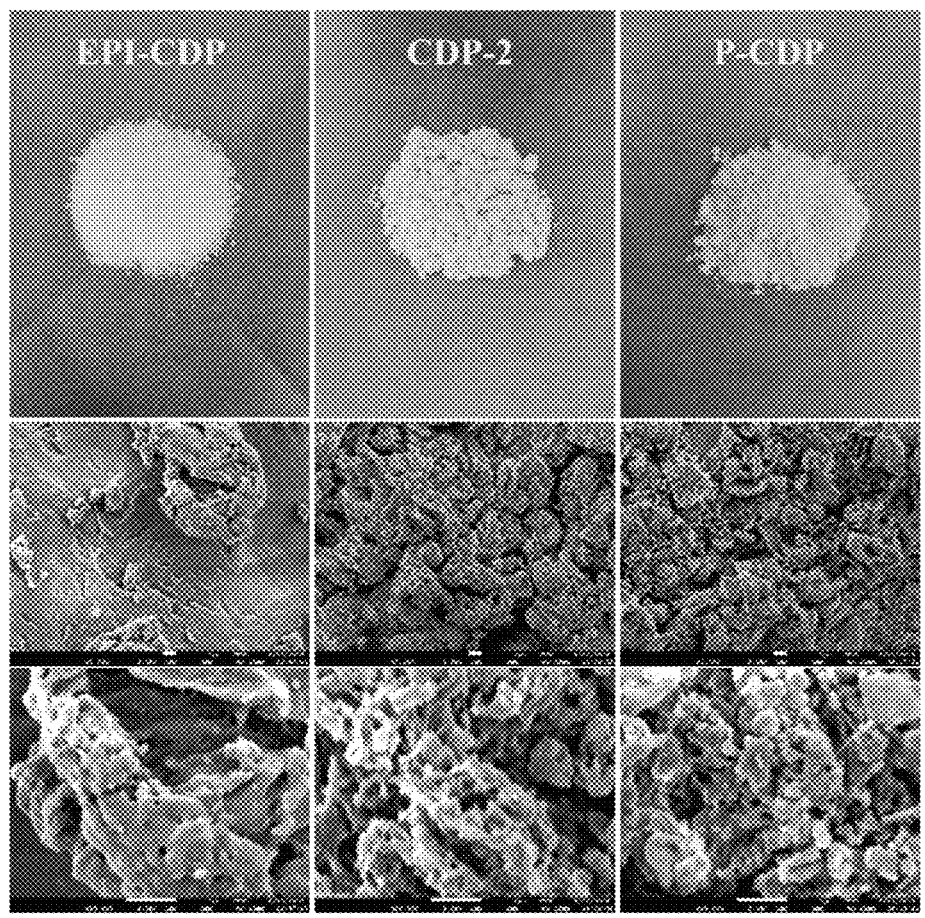
FIG. 4 shows macroscopic views (top) and scanning electron micrographs (middle and lower) of Example 2 and Comparative Example 1 and Comparative Example 2, in which the electron micrographs in the middle portion are magnified by 5000 times, and the electron micrographs at the bottom are magnified by 20,000 times.

From the scanning electron microscope photograph of FIG. 4, it can be seen that the polymer EPI-CDP obtained by crosslinking epichlorohydrin alone with β-cyclodextrin in Comparative Example 1 has a compact structure and no obvious pore structure. The polymer P-CDP particles prepared by using tetrafluoroterephthalonitrile alone and β-cyclodextrin in Comparative Example 2 were small and loose in structure, and contained a relatively significant macroporous structure. The polymer CDP-2 prepared by the mixed crosslinking of epichlorohydrin and tetrafluoroterephthalonitrile in Example 2 has a distinct honeycomb structure and contains a distinct macroporous structure.

Figure 5:
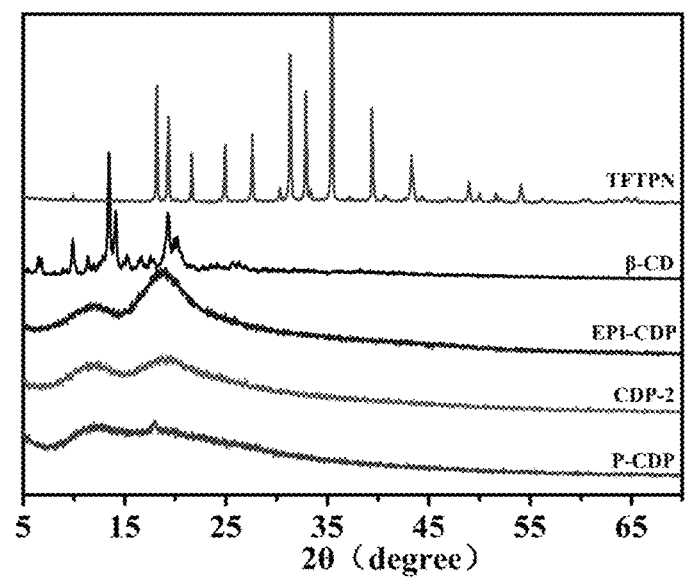
FIG. 5 is a powder X-ray diffraction pattern of Example 2 and Comparative Example 1 and Comparative Example 2.

The polymer was subject to X-ray diffraction analysis to characterize the crystal structure thereof, and the results are shown in FIG. 5. It can be seen that both the cyclodextrin monomer and the tetrafluoroterephthalonitrile monomer have obvious diffraction peaks, indicating that they are crystals. Yet all of the cyclodextrin polymers prepared in Comparative Example 2, Example 1, and Example 2 have no sharp diffraction peaks, and only have two obvious raised portion in the range of 5 to 25 of 2θ, indicating that these polymers are amorphous.

Figure 6:
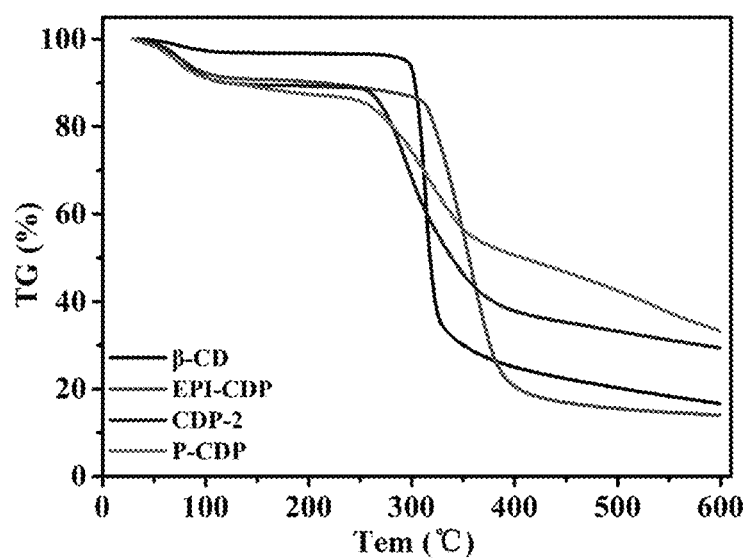
FIG. 6 is graph showing thermogravimetric curves of Example 2 and Comparative Example 1 and Comparative Example 2.

The thermal stability of the polymer was determined by Thermogravimetric analysis as shown in FIG. 6. It can be seen that the cyclodextrin polymers prepared in Comparative Example 2, Example 1, and Example 2 were stable at 250° C. or lower. Further, the mass loss of the polymer CDP-2 in the range of 250 to 300° C. was between the polymer EPI-CDP in Comparative Example 1 and the polymer P-CDP in Comparative Example 2. This also shows that in Comparative Example 2, epichlorohydrin and tetrafluoroterephthalonitrile were mixed and crosslinked with β-cyclodextrin to form a novel cyclodextrin polymer.

Figure 7:
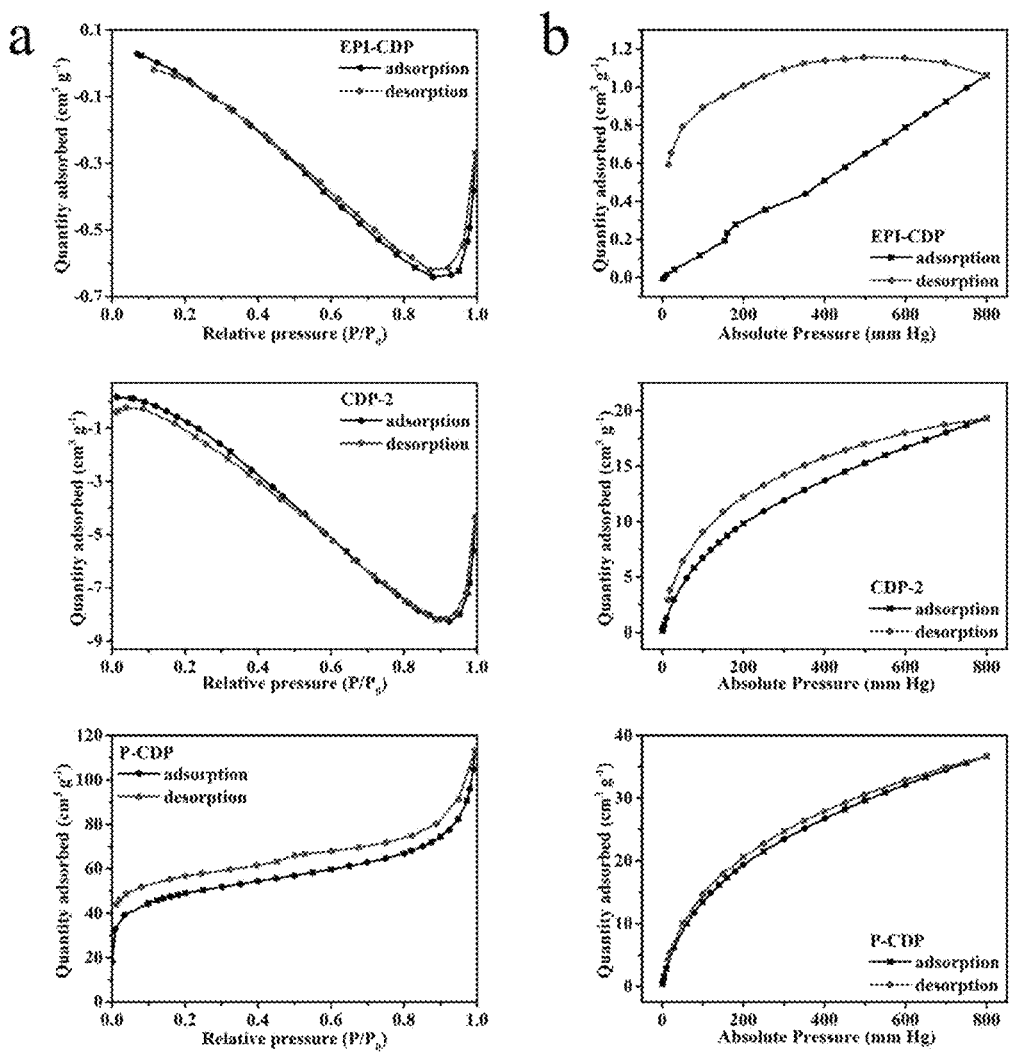
FIG. 7 shows adsorption desorption isotherms of $N_2$ (a) and $CO_2$ (b) of Example 2 and Comparative Example 1 and Comparative Example 2.

The specific surface area of the polymer was determined by gas adsorption method as shown in FIG. 7. It can be seen that the P-CDP in Comparative Example 2 measured by the $N_2$ adsorption method has a large BET specific surface area (169 m$^2$/g), and both the EPI-CDP in Comparative Example 1 and the CDP-2 in Example 2 have a low BET specific surface area (10 m$^2$/g or less). In general, for smaller micropores or even ultramicropores, the $CO_2$ adsorption method is more suitable than the $N_2$ adsorption method because the $CO_2$ adsorption method is conducted at 0° C. and the molecular diffusion is faster than that of the $N_2$ adsorption method carried out at liquid nitrogen temperature (−196° C.), and the adsorption equilibrium is easily achieved. Thus, the specific surface area of several polymers was further measured using the $CO_2$ adsorption method. The results show that the Langmuir specific surface area of the polymer CDP-2 can reach 103 m$^2$/g, while the Langmuir specific surface area of the EPI-CDP in Comparative Example 1 was still only 1.2 m$^2$/g. Meanwhile, the Langmuir specific surface area of the P-CDP in Comparative Example 2 was only slightly increased (increased by about 14%) from the BET specific surface area. This indicates that the CDP-2 contains many ultramicropores, while the EPI-CDP does not contain pores and the P-CDP mainly contains some relatively large micropores and mesopores.

Removal of Bisphenol A from Water by Cyclodextrin Polymer

In order to characterize the excellent performance of cyclodextrin polymers, the adsorption kinetics of BPA in water by various cyclodextrin polymers were investigated and compared with commercial adsorbents of activated carbon DARCO-AC and adsorption resin XAD-4. The specific steps are as follows: 0.05 g of adsorbent was added into a 100 ml beaker and an agitating magnet was placed in the beaker, the rotation speed of the magnetic stirrer was adjusted to 150 rpm, and 50 ml of BPA solution with a concentration of 0.1 mmol L$^{-1}$ was added. A small amount of water sample was taken up with a injector at certain time intervals, filtered through a PTFE-Q filter membrane into a liquid phase vial, and the concentration of BPA in the water sample before and after adsorption was determined by high performance liquid chromatography (HPLC). HPLC measurement conditions: Agilent high performance liquid chromatography, Waters C-18 column, UV detector, detection wavelength of 276 nm, mobile phase of methanol/water (70/30), flow rate of 1 ml min$^{-1}$, and column of 30° C.

The removal efficiency of BPA in the solution was calculated with the following formula:

$$\text{Pollutant removal efficiency} = \frac{c_0 - c_t}{c_0} \times 100$$

In the formula: $c_0$ (mmol l$^{-1}$) and $c_t$ (mmol l$^{-1}$) are the concentrations of BPA in the solution before and after adsorption, respectively.

The adsorption amount of BPA by the material was calculated with the following formula:

$$q_t = \frac{(c_0 - c_t)V}{m}$$

In the formula: $q_t$ (mmol g$^{-1}$) is the adsorption amount at time t (s), V (L) is the volume of the adsorption solution, and m (g) is the mass of the adsorbent.

The pseudo-second order kinetics equation:

$$q_t = \frac{k_2 q_e^2 t}{1 + k_2 q_e t}$$

and the Elovich equation:

$$q_t = \frac{1}{\beta} \ln(\alpha \beta t + 1)$$

were used to simulate the adsorption kinetic data of BPA, respectively.

In the equation: $q_e$ (mmol g$^{-1}$) is the adsorption amount at equilibrium, $k_2$ (g mmol$^{-1}$ s$^{-1}$) is the pseudo-second order kinetic rate constant, α (mmol g$^{-1}$ s$^{-1}$) is the initial adsorption rate, and β (g mmol$^{-1}$) is the desorption constant associated with surface coverage.

Figure 8:
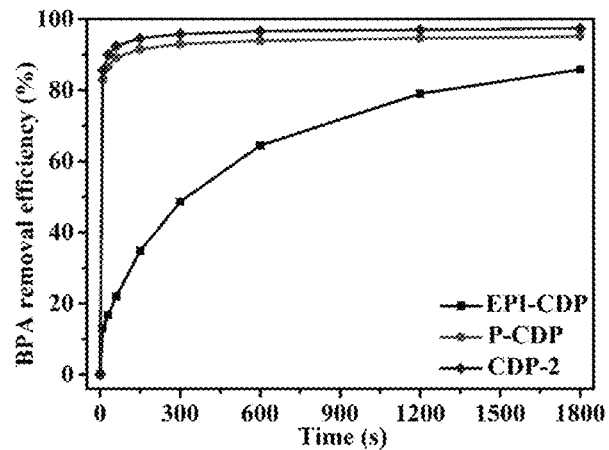
FIG. 8 is a graph showing the change in bisphenol A (BPA) removal efficiency over time in Example 2 and Comparative Example 1 and Comparative Example 2.

First, the cyclodextrin polymer CDP-2 prepared in Example 2 of the present disclosure was compared with the cyclodextrin polymers EPI-CDP and P-CDP in Comparative Example 1 and Comparative Example 2 for adsorption performance. The result is shown in FIG. 8. It can be seen that, under a condition where the BPA concentration was 0.1 mmol L$^{-1}$, both the CDP-2 in Example 2 and the P-CDP in Comparative Example 2 can eventually remove most of the BPA, and the removal efficiency exceeded 90%. The polymer EPI-CDP obtained by crosslinking only epichlorohydrin with cyclodextrinonly in Comparative Example 1 had a very slow adsorption rate and the adsorption equilibrium was not achieved within 30 min. The polymer P-CDP prepared by crosslinking only tetrafluoroterephthalonitrile with cyclodextrin in Comparative Example 2 had a very fast adsorption rate and the adsorption equilibrium was achieved within 10 min because it had a relatively large specific surface area.

The adsorption rate of the polymer CDP-2 in Example 2 was significantly higher than that of the polymer EPI-CDP in Comparative Example 1, and the adsorption equilibrium was achieved within 10 min, which is comparable to the porous cyclodextrin polymer P-CDP having a high specific surface area.

Figure 9:
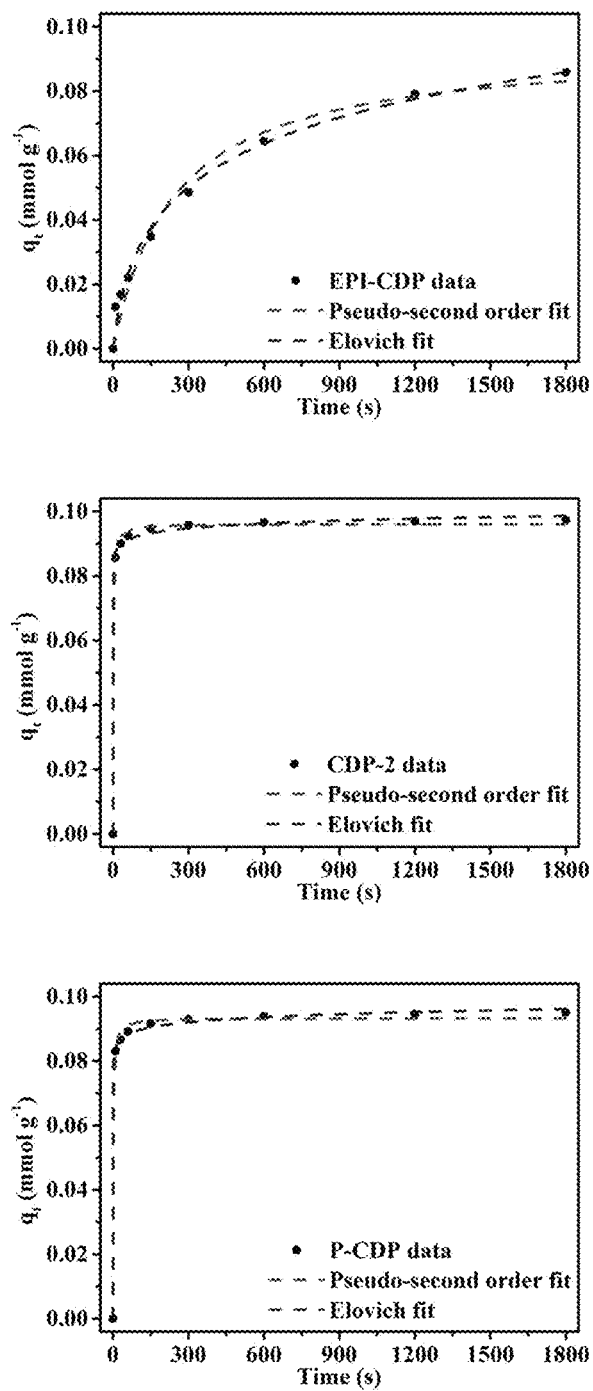
FIG. 9 is a graph showing fitting parameters for the adsorption kinetics of BPA in Example 2 and Comparative Example 1 and Comparative Example 2.

The result of kinetic simulation of the adsorption data is shown in FIG. 9. It can be seen that both the pseudo-second order kinetics equation and the Elovich equation can well fit the kinetic experimental data of the CDP-2 in Example 2, the EPI-CDP in Comparative Example 1 and the P-CDP in Comparative Example 2, indicating that the adsorption of BPA on these polymers is a multiple mechanism of action.

FIG. 10 shows the relevant parameters of two models of the pseudo-second order kinetics equation and the Elovich equation for fitting the experimental data. It can be seen that the correlation coefficients of the two models are high (>0.97), indicating that both models can fit the experimental data well. The kinetic constant obtained by fitting with the pseudo-second order kinetics equation showed that the adsorption rate constant of BPA on the cyclodextrin polymer CDP-2 prepared in Example 2 reached 7.61 g mmol$^{-1}$ s$^{-1}$, which is comparable to the rate constant (7.45 g mmol$^{-1}$ s$^{-1}$) of the cyclodextrin polymer P-CDP with high specific surface area prepared in Comparative Example 2 but much larger than the rate constant (0.0445 g mmol$^{-1}$ s$^{-1}$) of the polymer EPI-CDP prepared by crosslinking only epichlorohydrin with β-cyclodextrin in Comparative Example 1. In combination with that the EPI-CDP was non-porous, the P-CDP was porous, and the polymer CDP-2 contained a large number of ultramicropores capable of swelling into mesopores or macropores in solution, it is indicated that the porous structure and swelling property of the cyclodextrin polymer in the present disclosure resulted in a significant increase in the adsorption rate.

Recycling of Cyclodextrin Polymer

The reusability of the polymer was examined taking the cyclodextrin polymer CDP-2 prepared in Example 2 as an example. BPA was also used as a model pollutant. The change of the adsorption performance of BPA by the material under different reuse times was investigated. Specific steps were as follows: 50 mg of CDP-2 adsorbent was thoroughly contacted with 50 ml of 0.1 mmol L$^{-1}$ BPA aqueous solution for 10 min at 25° C. Then the suspension was centrifuged at 10000 r.p.m. The supernatant was taken and the concentration of BPA in the solution was determined by HPLC and the removal efficiency of BPA was calculated. The washed material was washed with 50 ml of methanol at room temperature and then used in the next adsorption experiment. This adsorption/desorption experiment was carried out five times in total.

The reusability of the material is shown in FIG. 11. After the methanol washing, the adsorption performance of CDP-2 on BPA in Example 2 was almost unchanged, and the removal efficiency of BPA in all five repeated experiments was over 90%, indicating that the material is easily regenerated by washing at room temperature with methanol.

Comparison of Adsorption Effects of Cyclodextrin Polymers Prepared in Different Examples on Bisphenol A Under Different Conditions Since epichlorohydrin has high reactivity and low cost, epichlorohydrin was selected as the flexible crosslinking agent in the Examples, but this does not means that other flexible crosslinking agents cannot be used.

In Examples 1 to 4, several different types of cyclodextrins (α, β, and γ-cyclodextrins) were separately used to prepare cyclodextrin polymers. The adsorption rates of these polymers for BPA are shown in FIG. 12. It can be seen that the use of α, β and γ three types of cyclodextrins and mixtures thereof can produce polymers with ultra-fast adsorption performance, and all the removal efficiencies of BPA can reach about 95% at 10 min. This is because the difference between different types of cyclodextrins is only the size of the cavity, and the reactive groups and adsorption sites are the same. Bisphenol A can be adsorbed by the cavities of all these cyclodextrins due to the small molecules thereof, so the obtained polymers all exhibit good adsorption performance for bisphenol A. Of course, when the size of the pollutant molecules is large enough, the adsorption performance of these polymers prepared from different cyclodextrins will show large differences.

Figure 13:
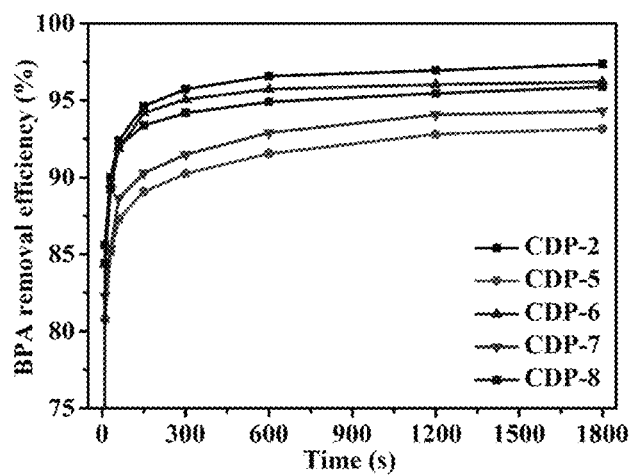
FIG. 13 is a graph showing the change in BPA removal efficiency over time for β-cyclodextrin polymers prepared with different rigid crosslinking agents.

In Example 2, Examples 5 to 8, cyclodextrin polymers were preparing using different rigid crosslinking agents. These rigid crosslinking agents include decafluorobiphenyl, tetrafluoroterephthalonitrile, decafluorobenzophenone and octafluoronaphthalene, as well as a combination thereof. FIG. 13 shows the adsorption rates of BPA by the cyclodextrin polymers prepared from different rigid crosslinking agents. It can be seen that both decafluorobiphenyl, tetrafluoroterephthalonitrile, decafluorobenzophenone and octafluoronaphthalene monomers, and the combination thereof can be used as a rigid crosslinking agent to prepare a cyclodextrin polymer having a very fast adsorption rate. Among them, tetrafluoroterephthalonitrile and decafluorobenzophenone are most preferred. Cyclodextrin polymers prepared by different rigid crosslinking agents may cause differences in adsorption performance due to differences in crosslinking degree and pore structure, etc. The above results indicate that the rigid crosslinking agent having a benzene ring structure functions mainly as a rigid support to enable the formation of a pore structure in the polymer. It will be appreciated that such a rigid crosslinking agent capable of reacting with a cyclodextrin will theoretically facilitate the adsorption of pollutants by the polymer.

Figure 14:
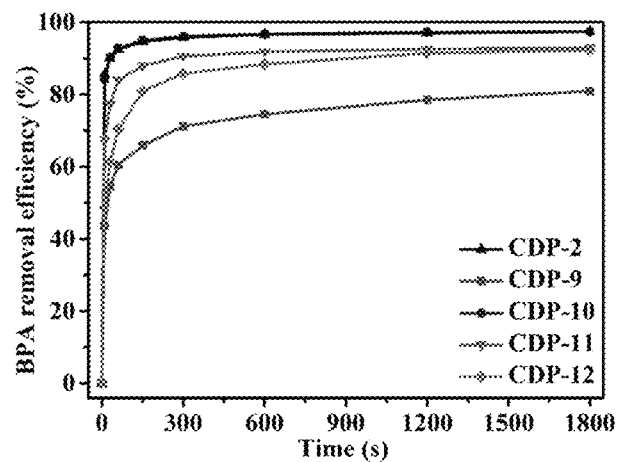
FIG. 14 is a graph showing the change in BPA removal efficiency over time for β-cyclodextrin polymers prepared with different amounts of rigid crosslinking agent.

In each of Example 2, Examples 9 to 12, tetrafluoroterephthalonitrile was used as a rigid crosslinking agent, and several cyclodextrin polymers were prepared under different amounts of rigid crosslinking agent. The molar ratio of the rigid crosslinking agent to the cyclodextrin used in the experiment was 0.1875 to 3. Similarly, the adsorption performance of each polymer was investigated using bisphenol A as a model pollutant. FIG. 14 shows the effect of the above different amount of rigid crosslinking agents on the BPA adsorption performance of the polymer. The results showed that the adsorption rate of the polymer was the slowest when the addition amount of the rigid crosslinking agent was 0.1875 of the amount of the cyclodextrin, and the adsorption equilibrium was not reached within 30 min. This may be because the rigid structure in the polymer is too small to form enough holes and supports. In addition, it is also not suitable to add too much rigid crosslinking agent. When the addition amount was 3 times that of the cyclodextrin, the adsorption rate was also relatively slow, and it took 30 min to reach the adsorption equilibrium. This may be because the excessive introduction of rigid groups resulted in a decrease in the swelling property of the material. When tetrafluoroterephthalonitrile is used as the rigid crosslinking agent, the suitable addition amount of the rigid crosslinking agent is 0.375 to 1.5 times that of the cyclodextrin. Among them, the effect is the best when the molar ratio of the addition amount of the rigid crosslinking agent to the cyclodextrin is 0.75. It will be appreciated that the most suitable amounts of rigid crosslinking agents are also different.

Figure 15:
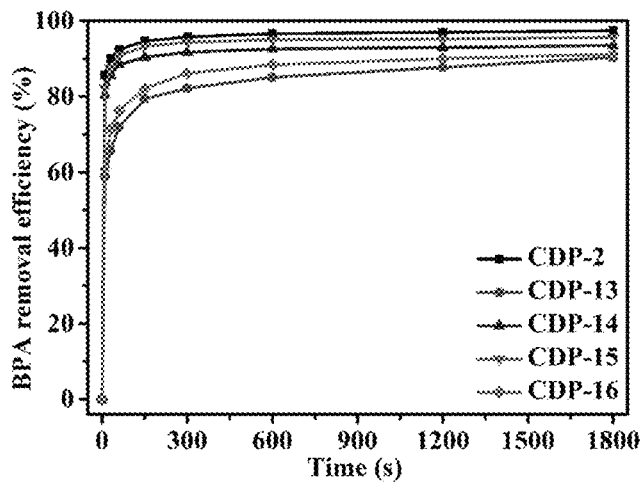
FIG. 15 is a graph showing the change in BPA removal efficiency over time for β-cyclodextrin polymers prepared with different amounts of epichlorohydrin.

In Example 2, Examples 13 to 16, several cyclodextrin polymers were prepared under different addition amounts of different flexible crosslinking agents (EPI). The molar ratio of EPI used to the cyclodextrin was 5 to 65. The effect of the amount of flexible crosslinking agent on the BPA adsorption performance of the polymer was investigated, as shown in FIG. 15. The results showed that when the amount of EPI was too much or too little, the prepared cyclodextrin polymer had a relatively slow adsorption rate for BPA, the adsorption did not reach equilibrium at 30 min, and the final adsorption amount decreased. This is because the adsorption rate of the final cyclodextrin polymer depends on the ratio of the rigid structure to the flexible structure in the polymer, and the best adsorption performance can only be obtained when the rigidity and the swellability of the material are ensured. A suitable amount of EPI is 20 to 50 times the molar amount of the cyclodextrin, and 35 times is the best. It should be recognized that a chain crosslinking agent other than epichlorohydrin may also be selected as the flexible crosslinking agent, as long as it can react with the hydroxyl group on the cyclodextrin or the group on the rigid crosslinking agent. The suitable amounts of different flexible crosslinking agents may also be different.

Figure 16:
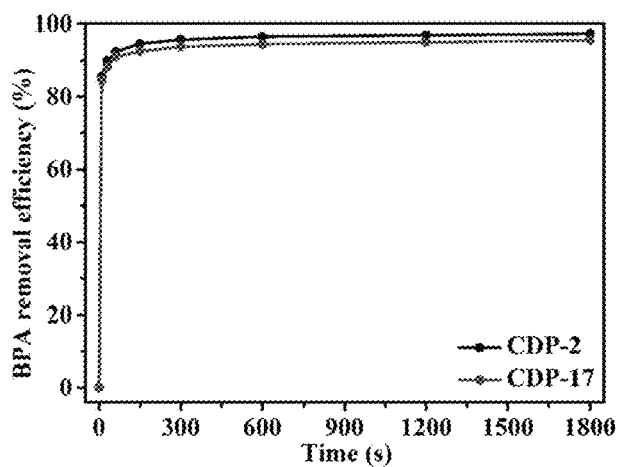
FIG. 16 is a graph showing the change in BPA removal efficiency over time for β-cyclodextrin polymers prepared in different alkaline environments.

In Example 2 and Example 17, two types of cyclodextrin polymers were respectively prepared under different alkaline environment conditions. The alkalies used were NaOH and KOH. FIG. 16 shows the effect of the cyclodextrin polymers prepared in two different alkaline aqueous solutions on the BPA adsorption performance. It can be seen that the cyclodextrin polymer with fast adsorption rate can be prepared under the conditions of two strong alkaline aqueous solutions of KOH and NaOH, and both the removal efficiencies of BPA can reach 90% or more. Since the alkaline environment mainly functions to remove hydrogen from the hydroxyl group on the cyclodextrin to form an anion and further cause a nucleophilic substitution reaction, it is necessary to use such a stronger alkali for the preparation of the cyclodextrin polymer.

Figure 17:
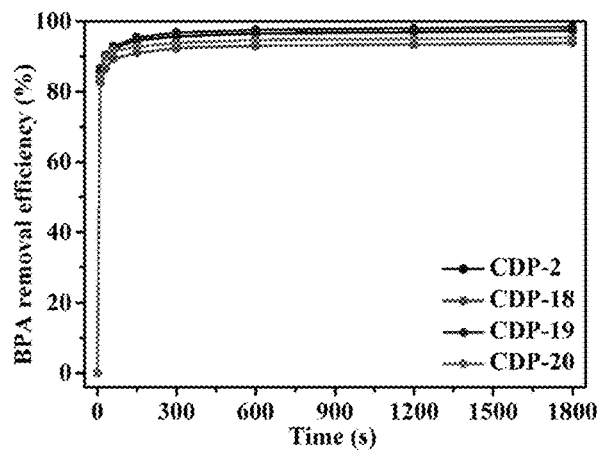
FIG. 17 is a graph showing the change in BPA removal efficiency over time for β-cyclodextrin polymers prepared at different alkali concentrations.

In Example 2 and Examples 18 to 20, several cyclodextrin polymers were respectively prepared at different NaOH concentrations. In FIG. 17, the effect of several cyclodextrin polymers prepared at different NaOH concentrations on the BPA adsorption performance is compared. The concentrations of NaOH solutions used were 2 to 8 mol $L^{-1}$. It can be seen from the figure that the adsorption rate of BPA by each of the cyclodextrin polymers prepared under the above several alkali concentrations is very fast, the adsorption equilibrium can be reached within 10 min, and the final removal efficiency can reach 90% or more.

Figure 18:
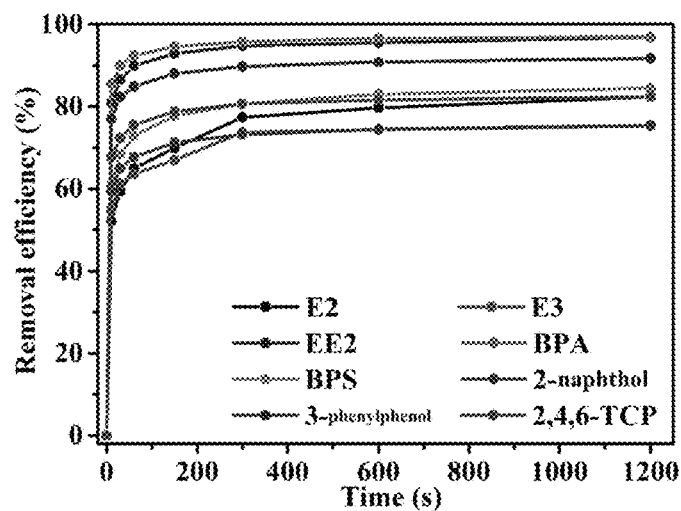
FIG. 18 is a graph showing the change in removal efficiencies of various organic micro-pollutants from water over time for the cyclodextrin polymer CDP-2 prepared in Example 2.

Adsorption of Different Types of Organic Pollutants in Water by Cyclodextrin Polymer The cyclodextrin polymer CDP-2 prepared in Example 2 was used as an adsorbent, and its adsorption effect on various different types of organic micro-pollutants in water was investigated. In addition to the aforementioned bisphenol A (BPA), the selected organic micro-pollutants also include bisphenol S (BPS, an additive that replaces bisphenol A in plastics, which is environmentally persistent), three typical endocrine disruptors (ethinyl estradiol (EE2), estradiol (E2), estriol (E3)), and three typical phenolic organic pollutants (2-naphthol, 3-phenylphenol, 2, 4, 6-trichlorophenol). The adsorption conditions were similar to those of the aforementioned bisphenol A except that the concentrations of the aqueous solutions of ethinyl estradiol and estradiol were 0.05 mmol/L (since their solubility in water was very low), the concentrations of the remaining pollutants were 0.1 mmol/L, the amount of adsorbent was 1 mg/ml, and the adsorption was carried out at room temperature. The relationship between the removal efficiency of various pollutants by CDP-2 over time is shown in FIG. 18. Similar to bisphenol A, all of the organic pollutants examined were able to be quickly and efficiently removed by CDP-2. The adsorption equilibrium can be achieved within 10 minutes, and the removal efficiencies of all pollutants were 70% or higher (the removal efficiencies of BPA, EE2 and 3-phenylphenol exceeded 90%). It is indicated that the cyclodextrin polymer prepared by the present disclosure can be effectively used for the removal of various organic micro-pollutants in water.

The above discussion is for illustrative purposes only and is not intended to limit the scope of the disclosure.

What is claimed is:

1. A method for preparing a cyclodextrin polymer, comprising:
    mixing a cyclodextrin with a rigid crosslinking agent and a non-rigid crosslinking agent to carry out a crosslinking reaction, wherein
    the rigid crosslinking agent is tetrafluoroterephthalonitrile,
    the molar ratio of the rigid crosslinking agent to the cyclodextrin is 0.375 to 1.5,
    the non-rigid crosslinking agent is epichlorohydrin, and the molar ratio of the non-rigid crosslinking agent to the cyclodextrin is 20 to 50, and
    carrying out the crosslinking reaction in an alkaline aqueous solution which is an aqueous solution of sodium hydroxide or potassium hydroxide.

2. The method according to claim 1,
    wherein the cyclodextrin is a-cyclodextrin, β-cyclodextrin, or y-cyclodextrin, and a combination thereof.

3. The method according to claim 1, wherein the concentration of the alkaline aqueous solution is 2 to 8 mol $L^{-1}$.

* * * * *